(12) United States Patent
Narbonne

(10) Patent No.: US 10,916,747 B2
(45) Date of Patent: Feb. 9, 2021

(54) ASSEMBLY OF ELECTROCHEMICAL CELLS USING AN ADDITIVE MANUFACTURING METHOD

(71) Applicant: SAFT, Levallois-Perret (FR)

(72) Inventor: Alexandre Narbonne, Blanquefort (FR)

(73) Assignee: SAFT, Levallois-Perret (FR)

( * ) Notice: Subject to any disclaimer, the term of this patent is extended or adjusted under 35 U.S.C. 154(b) by 137 days.

(21) Appl. No.: 16/093,293

(22) PCT Filed: Apr. 13, 2017

(86) PCT No.: PCT/EP2017/059031
§ 371 (c)(1),
(2) Date: Oct. 12, 2018

(87) PCT Pub. No.: WO2017/178634
PCT Pub. Date: Oct. 19, 2017

(65) Prior Publication Data
US 2019/0123315 A1 Apr. 25, 2019

(30) Foreign Application Priority Data
Apr. 14, 2016 (FR) ...................... 16 53315

(51) Int. Cl.
*H01M 2/10* (2006.01)
*B33Y 10/00* (2015.01)
(Continued)

(52) U.S. Cl.
CPC ......... *H01M 2/1077* (2013.01); *B29C 64/106* (2017.08); *B29C 70/84* (2013.01);
(Continued)

(58) Field of Classification Search
CPC ...... H01M 2/1077; B33Y 10/00; B33Y 80/00; B29C 64/10
See application file for complete search history.

(56) References Cited

U.S. PATENT DOCUMENTS

| | | | | |
|---|---|---|---|---|
| 8,871,371 B2* | 10/2014 | Song | ................... | H01M 10/615 429/120 |
| 9,306,251 B2* | 4/2016 | Inoue | .................. | H01M 10/613 |
| 2002/0177035 A1* | 11/2002 | Oweis | ................. | H01M 10/613 429/120 |

(Continued)

FOREIGN PATENT DOCUMENTS

| | | | |
|---|---|---|---|
| EP | 2 228 851 A1 | 9/2010 | |
| EP | 2 650 945 A1 | 10/2013 | |

(Continued)

OTHER PUBLICATIONS

International Search Report for PCT/EP2017/059031 dated May 29, 2017 [PCT/ISA/210].

*Primary Examiner* — Ula C Ruddock
*Assistant Examiner* — Thomas H. Parsons
(74) *Attorney, Agent, or Firm* — Sughrue Mion, PLLC

(57) ABSTRACT

The invention relates to an assembly of a plurality of electrochemical elements (1), in which the electrochemical elements comprise a container (5) having a side wall, said assembly being characterized in that at least one portion of the side wall of at least one of the containers is in contact with a partition obtained by means of an additive manufacturing method, and is produced by superposing at least two strips (4) of a structural material.

25 Claims, 6 Drawing Sheets

(51) Int. Cl.
    *H01M 10/653* (2014.01)
    *H01M 10/655* (2014.01)
    *B29C 64/106* (2017.01)
    *B33Y 80/00* (2015.01)
    *B33Y 30/00* (2015.01)
    *B29C 70/84* (2006.01)
    *B29L 31/34* (2006.01)

(52) U.S. Cl.
CPC ............... *B33Y 10/00* (2014.12); *B33Y 30/00* (2014.12); *B33Y 80/00* (2014.12); *H01M 2/1094* (2013.01); *H01M 10/653* (2015.04); *H01M 10/655* (2015.04); *B29L 2031/3468* (2013.01)

(56) References Cited

U.S. PATENT DOCUMENTS

| | | | |
|---|---|---|---|
| 2012/0003508 A1* | 1/2012 | Narbonne | H01M 2/1094 429/8 |
| 2013/0108908 A1 | 5/2013 | Omura et al. | |
| 2014/0255647 A1* | 9/2014 | Johnson | B29C 67/00 428/118 |
| 2015/0155534 A1 | 6/2015 | Tsutsui et al. | |

FOREIGN PATENT DOCUMENTS

| | | | |
|---|---|---|---|
| EP | 2650945 | * | 10/2013 |
| EP | 2650945 A | * | 10/2013 |
| EP | 2 994 952 A1 | | 3/2016 |
| FR | 2 962 261 A1 | | 1/2012 |

\* cited by examiner

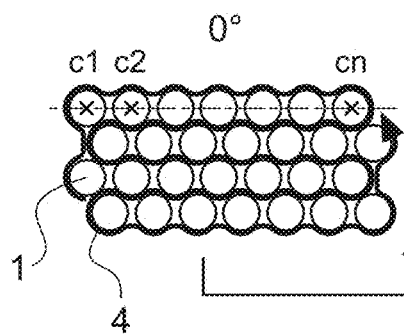
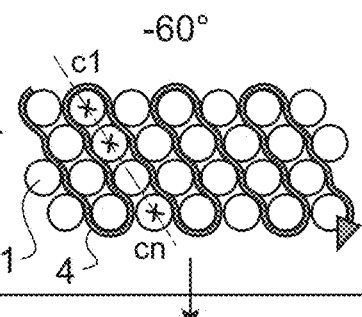
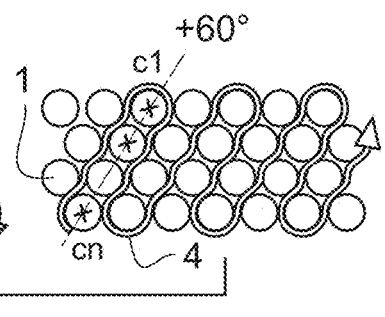
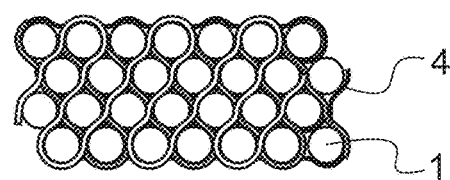
Fig.3a Fig.3b Fig.3c Fig.3d
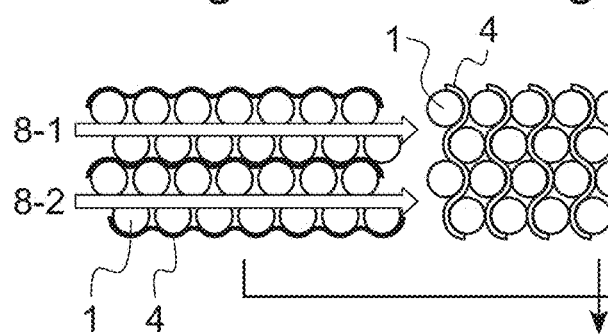
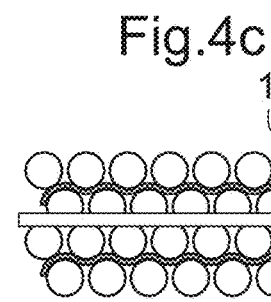
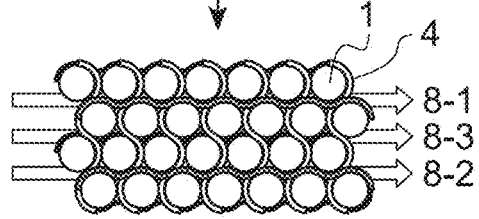
Fig.4a Fig.4b Fig.4c Fig.4d

ASSEMBLY OF ELECTROCHEMICAL CELLS USING AN ADDITIVE MANUFACTURING METHOD

CROSS REFERENCE TO RELATED APPLICATIONS

This application is a National Stage of International Application No. PCT/EP2017/059031, filed on Apr. 13, 2017, which claims priority from French Patent Application No. 1653315, filed on Apr. 14, 2016.

FIELD OF THE INVENTION

The invention concerns the field of processes for manufacturing an assembly of electrochemical cells.

BACKGROUND OF THE INVENTION

A battery generally comprises a plurality of electrochemical storage cells (simply called "cells" hereinafter) arranged side by side in a common casing. They must be held together as a unit so that they are unable to move when mounted in the casing. Indeed, in case of vibration or shock and lack of maintenance, the cells would move in the casing randomly. Such shifting could cause damage or breakage of components of the battery or even of the cells themselves.

Several techniques exist for assembling such cells.

A first technique is to use mechanical attachment means of plastic and/or metal between the cells. These connecting means are usually prefabricated using common manufacturing processes such as machining, injection molding and stamping. They are then assembled onto the cells by screwing, clipping, bonding or any other method of assembly.

Document EP No. 2,200,110 for example describes a system for holding cells, the system comprising:
- a first tray member provided with through openings;
- a plurality of adapter cups, each adapter cup being placed on the top portion of a cell and to is received in one of the through openings of the first tray member,
- a second tray member provided with through openings;
- a plurality of rings placed on the bottom portion of the cells and to be received in one of the through openings of the second tray member.

This method still requires prefabricating the structural parts, investing in manufacturing tools, storing the parts, and limits the possible geometries to those methods of obtaining which have been adopted. Moreover, once the dimensions of the parts are established, it is difficult to change the geometry of the battery.

A second method consists in encapsulating the cells in a block by embedding them more or less in a liquid material that subsequently hardens. This material is generally a bulk or foamable thermosetting resin. Document EP 2,403,050 discloses such a method. Nevertheless, this method has the following disadvantages:
- it requires the use of a molding tool;
- leakage of resin is sometimes observed and is difficult to control;
- air pockets up to several centimeters in diameter may be formed. These pockets can lead to poor thermal protection of the cells. Moreover, they are difficult to detect;
- casting a large amount of resin (greater than 5 liters) into a casing requires the use of a resin having a long setting time, which does not favor productivity.

Finally, the very principle of casting rules out the creation of complex geometries in the cast material, which can make for better performance of the battery.

Therefore, there is a need for a new technique for assembling cells making it possible to overcome at least one of the disadvantages of prior art methods.

SUMMARY OF THE INVENTION

To this end, the invention provides a method for producing an assembly of at least two cells, using an additive manufacturing technique. The term "additive manufacturing" synonymous with "3D Printing", means a technique for providing the shape of a workpiece by adding material and/or stacking successive layers, as opposed to shaping by removal of material such as machining.

A first layer consisting of a continuous bead or filament of a structuring material is deposited in contact with one of the cells. After waiting until it has completely or partially solidified (or for its cohesion in the case of a structuring material in powder form), a second layer consisting of a structuring material bead is deposited on the first bead layer and/or on one of the cells. One then waits for complete or partial solidification of the second bead. The steps of depositing a bead layer and solidifying (or achieving cohesion) are alternately repeated as many times as necessary, until a sufficient height of the beads is reached. The stacking of the beads in the direction of the longitudinal axis of the container makes it possible to construct a wall that holds the cells in position.

The term "assembly" used below refers to the product obtained by the action of assembling multiple parts.

Firstly, the invention therefore provides the use of an additive manufacturing technique for assembling a plurality of electrochemical cells.

Secondly, the invention provides a method of manufacturing an assembly of a plurality of electrochemical cells, the cells each comprising a container having a wall, said method comprising the steps of:
a) providing a plurality of cells;
b) depositing a bead $C_i$ of at least one material in contact with at least a portion of the wall of one of the containers;
c) total or partial solidification of the material;
d) depositing a bead $C_{i+1}$ of a material either on at least a portion of the previously deposited bead $C_i$ or on an electrochemical cell, the material of the bead $C_{i+1}$ being able to be the same or different from the material of the bead $C_i$,
e) repeating steps b) to d) until overlaying of the beads leads to the formation of partitions ensuring the assembly of the cells.

Thirdly, the invention provides a method of manufacturing an assembly of a plurality of electrochemical cells of prismatic shape or of the pouch type, the cells each comprising a container having a wall, said method comprising the steps of:
a) providing an electrochemical cell $E_i$;
b) depositing at least one bead $C_i$ of at least one material in contact with at least a portion of the wall of the container of cell $E_i$;
c) total or partial solidification of the material of bead $C_i$;
d) placing an electrochemical cell $E_{i+1}$ on top of cell $E_i$;
e) depositing at least one bead $C_{i+1}$ of at least one material in contact with at least a portion of the container wall of cell $E_{i+1}$, the material of the bead $C_{i+1}$ being able to be the same or different to that of bead $C_i$;

f) total or partial solidification of the material of the bead $C_{i+1}$;

g) repeating steps d) to f).

The methods forming the second and the third subject matter of the invention may have one or several of the following features:

Bead $C_i$ of step b) may be constituted of a thermoplastic material deposited in the form of a viscous liquid or a gel. It can also be made of a thermosetting material, the solidification of which in step c) is brought about by a monomer polymerization reaction in the presence of a crosslinking agent.

The methods forming the second and third subject matters of the invention may further comprise, between steps c) and d), a step of foaming the material of bead $C_i$.

Each bead may have a thickness, measured in the direction of the longitudinal axis of the container, varying from 0.1 to 10 mm.

The same bead $C_i$ may comprise at least two materials of different natures.

Two beads may have different thicknesses.

The pattern followed by depositing bead $C_i$ can be obtained:

a) either by moving an apparatus for depositing the bead and holding the plurality of cells in a fixed position, or b) by moving the plurality of cells and maintaining the device for depositing the bead in a fixed position.

The pattern of deposition of bead $C_i$ can be achieved either in a plane or in the three directions of space, and bead $C_i$ being in contact with the cells and/or bead $C_{i-1}$.

Fourthly, the invention provides an assembly of a plurality of cells in which the cells comprise a container having a wall, said assembly being characterized in that at least a portion of the wall of at least one container is in contact with a partition consisting of the overlaying of a plurality of beads of a structuring material, that is to say at least two beads of a structuring material.

The assembly may have one or more of the following features:

Bead $C_i$ can be deposited in a first main direction, and bead $C_{i+1}$ is placed on top of the bead $C_i$ and is deposited in a second main direction.

The change in angle of the main direction of deposition of two adjacent beads $C_i$ and $C_{i+1}$ may be predetermined.

The assembly may comprise at least two rows of aligned cells and a gap may exist between two rows, this empty space constituting a channel for natural or forced circulation of a fluid.

The assembly may comprise at least two channels for natural or forced circulation of a fluid.

The assembly may comprise at least three rows of cells, and at least one bead defines a non-rectilinear channel extending in two or three dimensions of space, for circulation of fluid. One end of the channel may serve as an inlet for the fluid flow and the other end used for exit of the fluid flow.

The circulation of the fluid in the space between the beads $C_i$ and $C_{i+n}$ with $n \geq 1$ can take place in the opposite direction to the circulation of fluid in the space between the beads $C_i$ and $C_{i-p}$ with $p \geq 1$.

The assembly may comprise means to improve heat exchange, these means being for example selected from the group consisting of plenums, heat sinks, separator plates, heat exchangers, heat pipes and structural parts. These means may be molded in a material also used to make a bead.

At least one space between adjacent cells may be completely filled with a single deposition of a structuring material.

The material in contact with the cells located at the periphery of the assembly may have a different density, for example greater, than that of the material in contact with cells not at the periphery of the assembly.

The assembly may comprise one or more accessory parts, and/or one or more sensors.

The spaces between adjacent cells may be devoid of bead material and communicate with each other, these spaces extending in one, two or three directions in space.

BRIEF DESCRIPTION OF THE DRAWINGS

FIGS. 3a to 3c each show the layout of a structuring material bead in one main direction. FIG. 3d shows the stack of the three bead layers of FIGS. 3a to 3c.

FIG. 4a shows an arrangement for obtaining two air flow channels in four rows of cells. The channels are materialized by two gaps located between two rows of cells.

FIG. 4b shows an embodiment where a bead of a structuring material is deposited in a main direction 90° to the horizontal.

FIG. 4c shows four rows of cells. A channel is materialized by the space between two rows of cells.

FIG. 4d shows the overlaying of three bead layers of FIGS. 4a to 4c.

DESCRIPTION OF PREFERRED EMBODIMENTS

The additive manufacturing technique consists in depositing layer-by-layer a material which after solidification or cohesion produces a structure which holds the cells together. A nozzle delivering a structuring material moves in three directions of space. Its movement is controlled by computer-aided design (CAD) software. A computer uses a digital file containing the 3D coordinates of locations where the structuring material is to be deposited.

Figure 1:
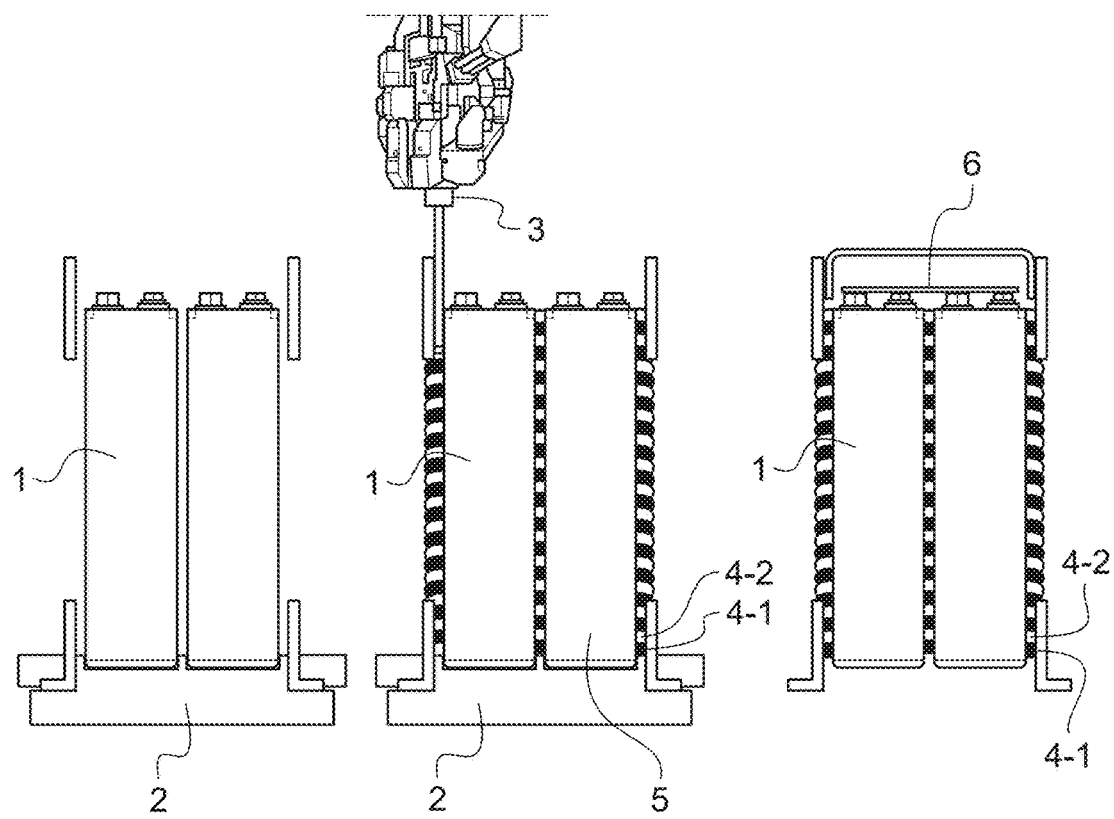
FIG. 1 shows, in chronological order, different sectional views of an assembly of cells at different stages of the manufacturing process.

FIG. 1 illustrates the principle of the additive manufacturing technique applied to an assembly of two cells. The steps are represented chronologically from left to right. Two cells 1 are arranged side by side on a carrier 2. The role of the carrier is to maintain each cell in a predetermined fixed position. A nozzle 3 directed by a robot 20 delivers a first continuous bead 4-1 of a structuring material onto the carrier and in contact with the container 5 of the two cells. This material can be either in the form of a viscous liquid or gel or in the form of a powder. After solidification of the bead material (or after the cohesion, if it is a powdered material), the nozzle deposits a second continuous bead 4-2 of material which solidifies in its turn above the first bead. The beads are stacked one on the other until the stack reaches a certain height. A partition wall is thus formed which maintains the two cells together. The assembled cells can then be removed from their carrier.

The assembly obtained by the method according to the invention is readily distinguished from an assembly obtained by casting foam because of the characteristic appearance of the surface structure of the material after solidification. Indeed, the partition obtained has a series of undulations resulting from the deposition of successive beads. These undulations are absent in an assembly process employing one-time casting of a resin.

In the example illustrated in FIG. 1, the movement of the nozzle takes place in a horizontal plane and the layers obtained are horizontal. They are generally deposited parallel to each other, the stacking direction preferably being parallel to the longitudinal axis of the container of the cells. Nevertheless, the invention is not limited to the deposition of horizontal layers. Indeed, the movement of the nozzle can also be performed in a vertical direction. By associating a displacement of the nozzle simultaneously in the horizontal plane and in the vertical direction a helical bead can be obtained.

The method according to the invention makes it possible to automatically fasten the cells one to the other during the stacking of the beads, causing the formation of a bulk structure (or matrix). It is therefore no longer necessary to provide additional mechanical connection means between the cells of a given battery, since the mechanical retention function is now obtained by solidification of the bead material (or its consolidation in the case of sintering a powder).

Parts, illustrated by reference numeral 6 can be added to the assembly. These may be caps, lids, clamps, and various supporting accessories. These parts can have been manufactured beforehand and subsequently fixed to the assembly. They can also be manufactured on the assembly, by the additive manufacturing technique.

Figure 2A:
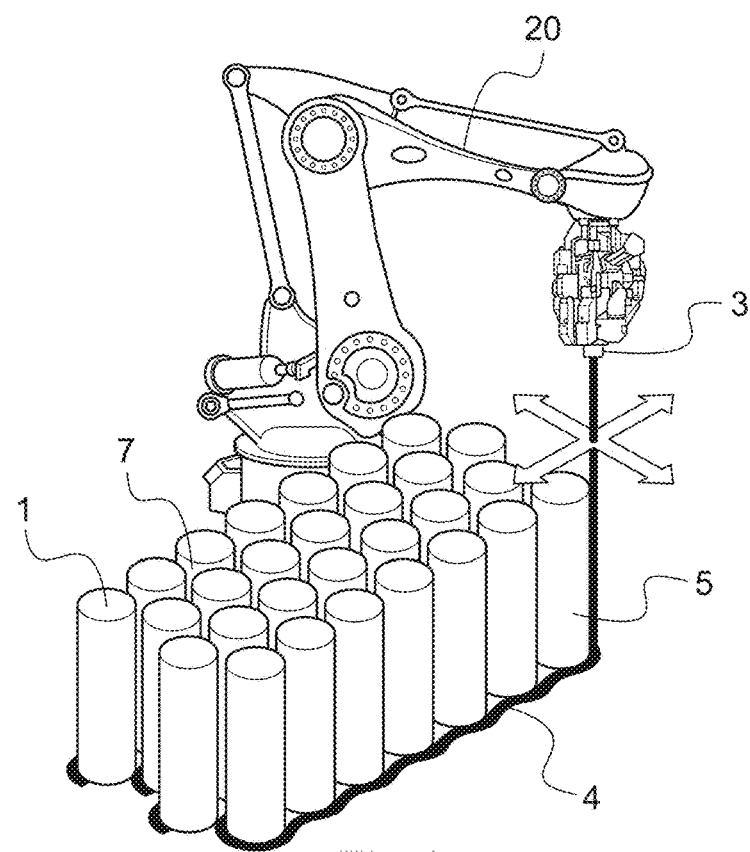
FIG. 2a is a diagrammatic view of an additive manufacturing tool, provided with a nozzle in contact with a container of the cells for depositing a bead of a structuring material capable of solidifying or consolidation in contact with the container.

The method of the invention can be applied to the assembly of a high number of cells. FIG. 2a illustrates the movement of a nozzle 3 over a plurality of cells 1 aligned in rows. The structuring material bead 4 shown closely follows the shape of a portion of the container 5 of the cells located at the periphery of the assembly. The nozzle can also move vertically in spaces 7 between the cells and thereby deposit a bead of material in these areas. It is possible to vary the flow of material delivered by the nozzle. This makes it possible to provide beads having a thickness generally ranging from 0.1 mm to 10 mm, the thickness being measured in the direction of the longitudinal axis of the container.

In FIG. 2a, the container 5 of the cells is cylindrical in shape, but any other shape is possible, such as a parallepiped format, also known as prismatic. Moreover, the cells are shown aligned, but the method of the invention also would be suitable for a non-ordered arrangement of the cells.

Figure 2B:
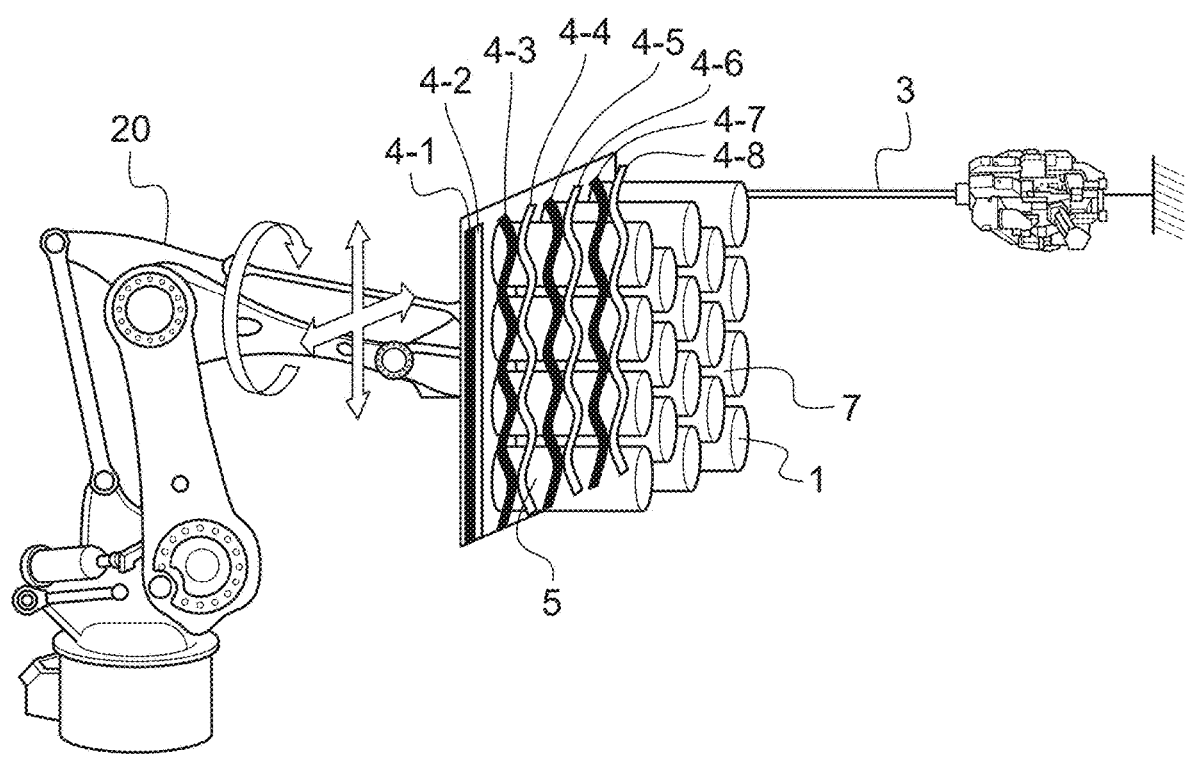
FIG. 2b is a diagrammatic view of the step of depositing a bead of structuring material in contact with the container of the cells. A fixed position nozzle delivers the structuring material. The cells are arranged on a movable carrier the movement of which is governed by a robot.

Generally, it is the movement of the nozzle that makes it possible for the pattern of the bead to be formed around the cells. The carrier for the cells is in this case fixed. A configuration in which the nozzle is fixed and the carrier moves is also possible. In this regard FIG. 2b is a diagrammatic view of depositing a bead of structuring material in contact with the container of the cells. A fixed nozzle 3 provides the structuring material. The cells 1 are arranged on a movable carrier whose movement is governed by a robot 20. The first two beads 4-1, 4-2 are arranged in a plane and closely follow the shape of the wall of the container facing outwardly. The beads 4-3, . . . , 4-8 placed on top of the first two beads 4-1, 4-2 also conform to the shape of the wall of the container facing outwardly and their wavelike appearance is a result of moving the nozzle in the direction of the longitudinal axis of the cells.

One of the advantages of the process according to the invention is that it adapts to any kind of container. One can quickly change the format of the cells on a production line. If the format changes, the digital file containing the coordinates of the beads is replaced in the computer controlling the nozzle by a new digital file containing the new coordinates of the beads to be produced. The invention eliminates the need to use different tools for different formats of cells. Inventory management is facilitated.

The structuring material used to make a bead is usually a good electrical insulator and will have a low thermal conductivity, such as a plastics material. This reduces the risk of a short circuit between two neighboring cells and prevents heat which is being released by one of the cells spreading to neighboring cells. The material can be deposited either in the form of a viscous liquid or a gel or in the form of a powder.

In the case of a material deposited in the form of a bead of a viscous liquid or gel, the material may be a thermoplastic polymer deposited using a hot nozzle. The polymer hardens during cooling. Possible thermoplastic materials include acrylonitrile butadiene styrene (ABS), polycarbonates, polyamides, polyphenylene sulfides (PPS), polyetherimide (PEI), polyethylene (PE), polypropylene (PP), poly (vinyl chloride) (PVC), copolymers of styrene-ethylene-butylene-styrene (SEBS), polystyrene (PS). These materials may be used in solid form or in the form of a foam by addition of an external foaming agent. Another family of polymers that can be deposited in the form of a bead of a viscous liquid or gel consists of thermosetting polymers. Curing of the polymer may be brought about either by a monomer polymerization reaction in the presence of a crosslinking agent, or under the effect of ultraviolet light flashes applied to a bath of photosensitive resin or under the effect of the projection an image onto a bath of photosensitive resin. Examples of thermosetting polymers include epoxy polymers, polyurethanes, polyesters, silicones, polyisocyanurates. These polymers are either already in the form of a foam, or are formed as a foam by the addition of a gas or a blowing agent.

In the case of a material deposited in the form of a powder, this may be a thermoplastic polymer. The cohesion of the powder particles is obtained by sintering, for example by laser sintering.

The use of CAD software provides very high accuracy as regards the nature and the locating of the bead layers. The invention makes it possible to create an assembly structure having a non-homogeneous composition and/or porosity. For example, the beads may have different thicknesses or be made of dissimilar materials. A given bead may include different types of materials. Some beads may exhibit a different porosity or density to those of other beads.

A partition which is made up by overlaying a plurality of beads can have several zones, each zone being characterized by a constant thickness of the beads located within this area. A partition may have multiple zones of differing porosity or densities.

The method makes it possible to adapt the aforementioned characteristics of the bead (its chemical nature, thickness, density, porosity) depending on the location of the bead in the assembly. Those parts of the assembly which are subjected to high mechanical stresses will be characterized by bead thicknesses and/or bead densities greater than that of parts subjected to lower mechanical stresses. A thickness, density or porosity gradient of the bead of material can be provided around a given cell along the longitudinal direction of the container of this cell, that is to say generally in the direction of stacking of the beads. It is indeed known that the container of a lithium-ion type cell typically swells during charging of the cell and that this swelling has a maximum amplitude at approximately mid-height of the container while it is less in regions close to the lid or bottom of the container. It can therefore be arranged for the bead of material used at half height of the cell to have rigidity greater than that of the bead of material used in the region close to the lid or the bottom area of the container which are less subject to swelling. This makes it possible to maintain a sufficient compression of the electrodes at mid-height of the container. This advantage is also useful as a means for compensating for volume variations due to different thermal expansion coefficients of the various materials used in the battery.

It is also possible to provide for the structuring material in contact with the cells situated at the periphery of the assembly to have a density greater than that of the structuring material in contact with cells not at the periphery of the assembly. The thicknesses of the beads of the structuring material located in contact with the cells at the periphery of the assembly can be thinner than those of the beads located in contact with the cells closest to the center of the assembly.

The direction of the bead path can vary from one layer to another. FIGS. 3a to 3c show a cross-sectional view of several aligned cells 1 of cylindrical format. The cross sections of the cells have a circular shape. The centers of the circles $c_1, c_2, \ldots, c_n$ are aligned in three directions. A first direction makes an angle of 0° relative to the horizontal (FIG. 3a), a second direction makes an angle of −60° relative to the horizontal (FIG. 3b) and a third direction makes an angle of 60° relative to the horizontal (FIG. 3c). In each of FIGS. 3a to 3c a primary direction of alignment of the bead can be defined. The primary alignment direction of the bead can be defined as the direction parallel to the direction forming an alignment of the center of cell cross-sections. For example in FIG. 3a, the centers of the cross-sections $c_1, c_2, \ldots, c_n$ are aligned in a direction making an angle of 0° with the horizontal. The structuring material bead extends in a direction substantially parallel to the direction formed by the alignment of the centers $c_1, c_2, \ldots, c_n$. Similarly in FIG. 3b, it is seen that the direction formed by the alignment of centers $c_1, c_2, \ldots, c_n$, is oriented at −60° relative to the horizontal. In FIG. 3c, the direction formed by the alignment of the centers $c_1, c_2, \ldots, c_n$ is oriented at +60° relative to the horizontal. FIG. 3c shows a stack of the three bead layers shown in FIGS. 3a to 3c. This stack makes it possible to maximize the fill factor of inter-cell spaces by the structuring material. In the example of FIG. 3d, this factor is estimated at 50%. This arrangement of the paths followed by the beads offers the following advantages:

the presence of the structuring material blocks fluid spreading from one cavity to another. Thus, if a gas is released from the container of a faulty cell, it does not spread to neighboring cells.

the assembly has a very high mechanical strength. There are no weak areas.

the structuring material is homogeneously distributed over the entire surface of the assembly, which confers isotropic mechanical properties thereon.

the cells are well insulated thermally.

The arrangement of the layers shown in FIGS. 3a to 3c is not limited to the main directions of alignment equal to 0°, −60° and +60°. Other angular alternatives for the main direction of alignment of the layers are possible. One can for example envisage a repeating stack of two bead layers, the first being arranged in a main direction equal to 0°, the second being arranged in a main direction equal to 90°.

One advantage of the method according to the invention is that it makes it possible to create air channels between the cells without having to resort to additional parts in order to materialize these channels. Indeed, one can leave sufficient space between two cells or between two rows of cells for creating a channel for natural or forced circulation of a coolant, such as air. Each channel may for example have a width of at least 5 mm. For a layer at a given level $C_i$, there may be one or more air channels. The direction of air flow in the channel or channels of a given layer may be different to the air flow direction in the channel or channels of another layer.

FIG. 4a shows four rows of cells. Two channels 8-1, 8-2 are created by the empty space between two rows of cells 1. These two channels are oriented in a direction making an angle of 0° relative to the horizontal.

In FIG. 4b, the beads are arranged in a main direction oriented at 90° to the horizontal. This arrangement blocks the air flow in directions oriented at 0° and 90° relative to the horizontal.

FIG. 4c shows four rows of cells. One channel 8-3 is materialized by the space between two rows of cell. It is oriented in a direction making an angle of 0° relative to the horizontal.

FIG. 4d shows the stack of three bead layers 4a to 4c. The fill factor is estimated at 30%.

It can be decided to arrange the air channels in the areas of the assembly that are most exposed to heating and otherwise fill areas of the assembly which are less subject to heating by a structuring material bead. The invention facilitates inventory management by reducing the number of parts required. There is indeed no further need to use parts for forming a fluid flow channel, this channel being created, in the invention, by the space between the cells or rows of cells.

The invention also makes it possible to mount accessories facilitating heat exchange. These can either be made additively so that they are automatically integrated into the assembly during construction of bead stacks, or they can be added to the assembly and secured thereto by molding. In the first case, the deposition of the structuring material bead can be extended beyond the assembly in order to create walls channeling air flow in an inlet region. The creation of these walls is done concurrently with the stacking of partitions. In the second case, the accessories are parts that are introduced into the assembly and are insert molded using a structuring material. Parts facilitating heat exchange can be selected from plenums, heatsinks, heat pipes or heat exchangers. Parts favoring heat exchange that are manufactured additively may consist of one or more phase change materials or one or more materials having a high specific heat capacity. These materials may further include thermal conductive fillers or fillers that improve mechanical properties.

Figure 5A:
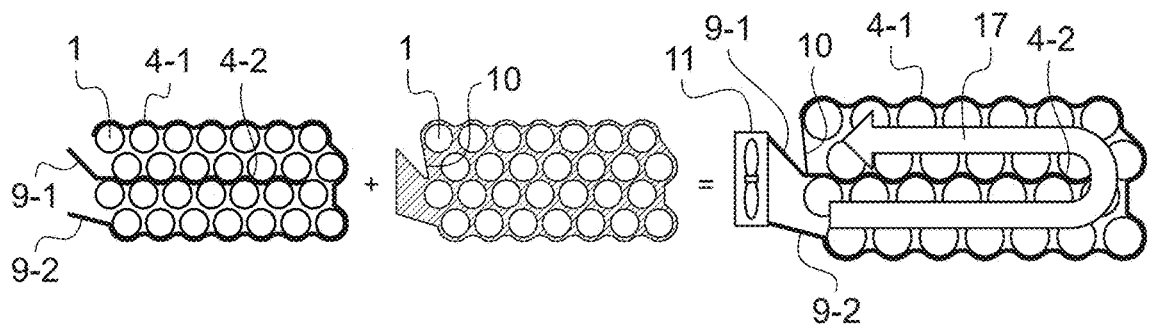
FIGS. 5a and 5b each show a view of an assembly of cells in which a partition consisting of a structuring material bead is arranged so as to create an air flow channel. The assembly is provided with walls made by the additive manufacturing process. It is also provided with separator plates.

The invention makes it possible to create airflow passages extending over two or three dimensions. For example, FIG. 5a shows a cross-sectional view of an assembly of cells in which a "U" shaped air circulation channel has been created. The assembly comprises four rows of cells. A first bead 4-1 of structuring material has been deposited on a portion of the container of cells at the periphery of the assembly. A second bead 4-2 has been deposited between the second and the third row of cells. An air circulation channel 17 in the shape of a "U" has thus been formed. The space between the two upper rows of FIG. 5a forms one leg of the "U". The space between the two bottom rows of the Figure form the second leg of the "U". Additive manufacturing has been continued to create two upstanding walls 9-1, 9-2 in the extension of two beads. A separator plate 10 has been attached to the assembly by molding. The plane of the plate is parallel to the bead layers. The assembly forms an air flow channel in the form of a loop. A fan 11 is placed in contact with the end of the walls to create a forced air flow.

Figure 5B:
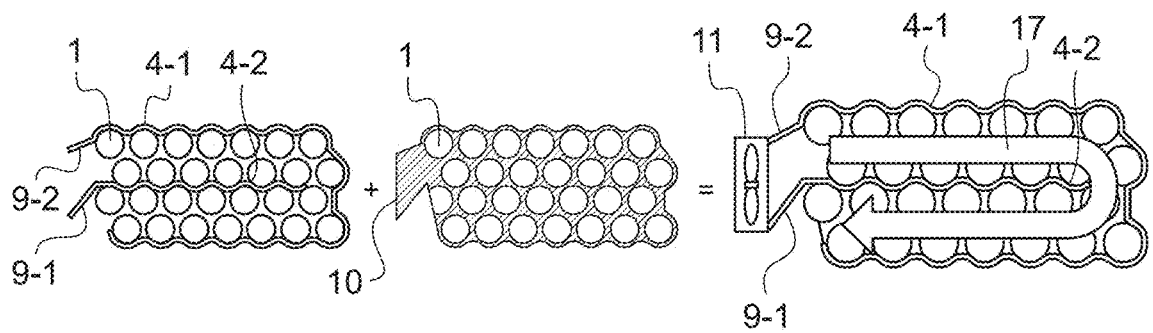

According to the same principle as that described for FIG. 5a, a looped air channel can be created in which the air flows from the upper branch of the U towards the lower branch of the U, in other words contrary to the direction of movement of air in FIG. 5a. The arrangement of FIG. 5b differs from that in FIG. 5a in that one of the upstanding walls 9-2 is located in the extension of the bead located at the upper position in FIG. 5b, whereas in FIG. 5a, the right-hand wall 9-2 results from extension of the bead located in the lower position. A separator plate 10 is arranged to focus the air flow in the looped air channel.

Figure 5C:
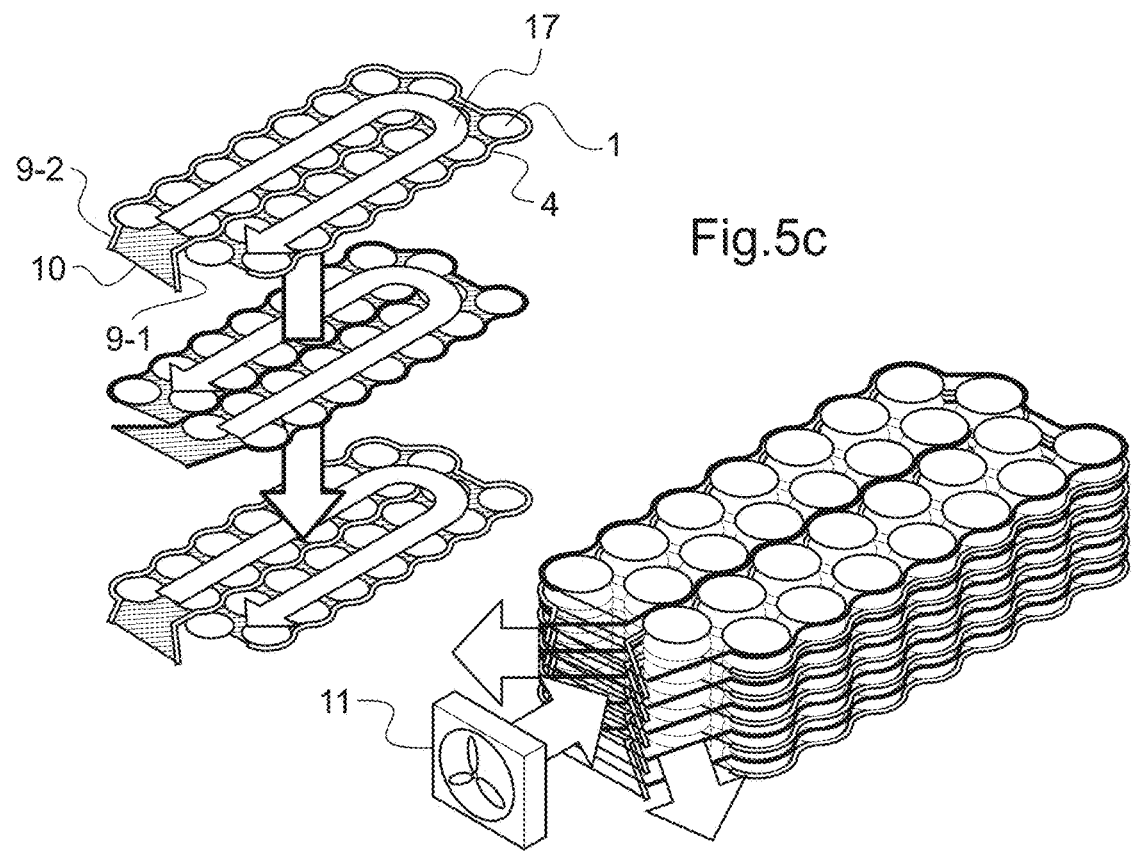
FIG. 5c shows the overlaying of three layers of beads; a first bead arranged as in FIG. 5a is interposed between two layers of beads arranged as in FIG. 5b. Forced ventilation is placed at the entrance and exit of air circulation channels.

FIG. 5c shows the overlaying of three layers of beads. A first layer comprising a bead and walls arranged in the arrangement of FIG. 5a is interposed between two layers each comprising a bead and walls arranged according to the arrangement of FIG. 5b. Forced ventilation is provided at one end of the channels. It is consequently possible to create looped air circulation channels in which the air flows in counterflow by overlaying bead layers. This makes it possible to obtain good homogeneity of temperature throughout the assembly, and good compactness of the assembly.

For the sake of clarity, the principle of the creation of air circulation channels by superposing bead layers is illustrated in FIGS. 5a and 5c with the example of an air circulation channel the height of which corresponds to the height of a bead. It will nevertheless be realized that air circulation channels of greater height can be created. It is possible to change the height of the air flow channel by changing the number of beads and/or the height of each bead. In addition, the air flow channel may extend in three directions in space, instead of the two directions shown in FIGS. 5a-5c. Finally, the shape of the channel is not limited to a U-shape, but any other shape is feasible, such as a "W" or "Z" shape.

Figure 6:
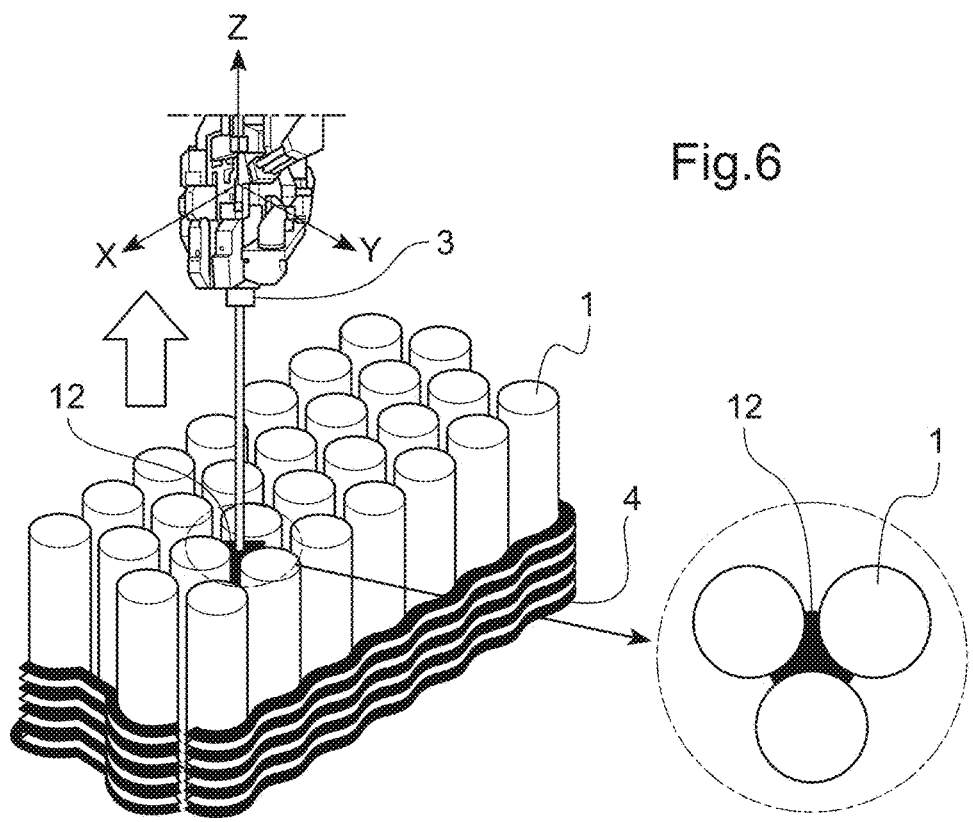
FIG. 6 shows an assembly of cells in which a space between adjacent cells is filled with a structuring material deposited in one single step.

It can be decided to use the technique of additive manufacture for certain parts of the assembly and to continue to use the known foam (or resin) casting technique for other parts of the assembly. For instance, it is conceivable for the wall of the container of the cells located at the periphery of the assembly to be held in position by superposing structuring material of beads obtained by moving the nozzle in a horizontal plane XY, while the space between adjacent cells is filled by depositing structuring material in a single direction, for example the vertical direction Z. This embodiment is illustrated in FIG. 6 which shows an assembly of cells 1 in which a space 12 located between adjacent cells is filled in a one-time operation with a structuring material. This embodiment has the following advantages:

it increases productivity. Depositing a single layer of a structuring material in the space between cells requires less time than the deposition of successive bead layers. Indeed, it is no longer necessary to wait for one layer to solidify prior to depositing the next layer on top.

when the space between the cells is devoid of structuring material, it can be used as a channel for flow of air in the vertical direction.

According to one embodiment of the invention, certain cells of the assembly are held in place by a material having a different density to that of the material used to hold other cells of the assembly in place. For example, the structuring material in contact with the cells located at the periphery of the assembly may have a density greater than that of the structuring material in contact with the cells which are not located at the periphery of the assembly. It is possible to vary the density of the material by varying its porosity.

Areas of the assembly devoid of a bead may or may not communicate with each other from layer to layer along 1, 2 or 3 directions in space. These areas left empty may or may not be aligned according to the privileged directions, to favor or not favor axes of weakness.

Figure 7:
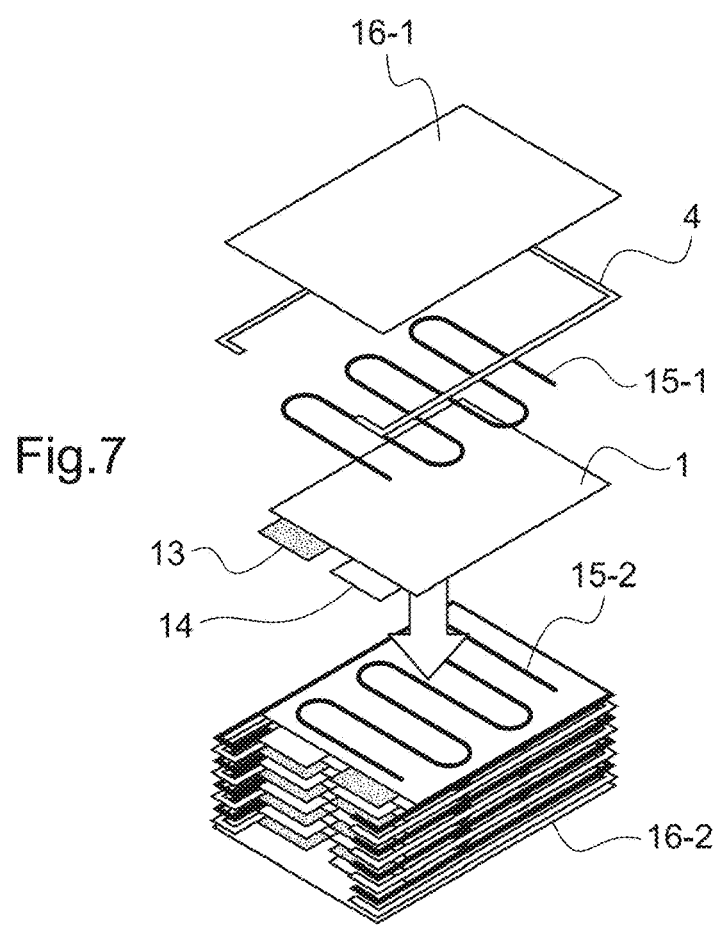
FIG. 7 shows an assembly of thin parallelepiped format cells in which the structuring material beads have been deposited concurrently with placing of the cells.

We shall now describe an embodiment suitable for thin parallelepiped format cells or "pouch" type cells. In this embodiment, the deposition of the bead of material is done concomitantly with placement of the cell. This can be a parallelepiped format cell of thickness less than or equal to 15 mm, preferably less than or equal to 10 mm. One, two or a greater number of bead(s) is/are deposited in contact with the periphery of the cell. The cell gets insert molded by the one or more bead(s) of structuring material and is held in place by solidification/cohesion of the structuring material. A second cell is placed over the first cell. One, two or a greater number of beads of material is/are deposited in contact with the periphery of the second cell. Preferably, a layer of an electrically insulating material is positioned between the two cells to prevent electrical contact therebetween or to improve the thermal insulation and adhesion between these two cells. The steps of stacking of cells and depositing structuring material beads are repeated as many times as necessary. FIG. 7 shows an assembly obtained by this process. A number of thin cells of parallelepiped format are stacked one on the other. The various components located towards the top of the stack are seen in exploded view. The ends of positive electrode 13 and negative electrode 14 foils can be seen protruding from electrochemical cell 1. Separators 15-1 and 15-2 electrically insulate one cell from the other two cells between which it is interposed. A structuring material bead 4 surrounds a portion of the cell. The two cells at the ends of the stack are covered with a wall 16-1, 16-2 which can be one of the walls of a casing for accommodating the battery.

Figure 8:
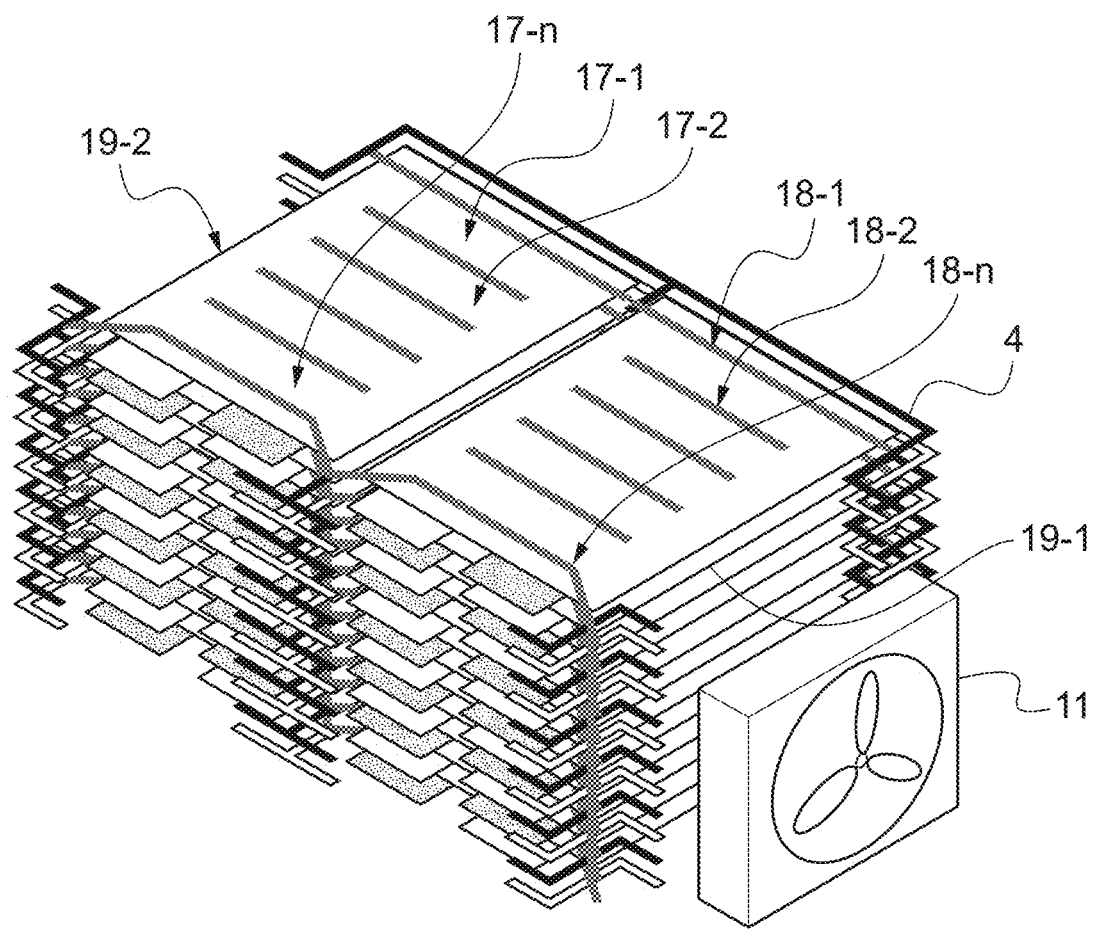
FIG. 8 is a view of an assembly of parallelepiped format cells of small thickness. A fan provides forced air convection.

It is possible to create air circulation channels 17-1, 17-2, ..., 17-n at the surface of the cells. FIG. 8 shows a view of an assembly of parallelepiped format cells, provided with a fan 11 providing forced air convection. The cells are surrounded by a bead 4 of a structuring material. Airflow channels result from the formation of straight parallel walls 18-1, 18-2, ..., 18-n deposited on one of the lateral faces of the cells. These partitions may be obtained by deposition of a bead according to the additive manufacturing process.

FIG. 8 shows that a portion 19-1, 19-2 of the length of each parallelepiped is not covered with bead of a structuring material. This portion not covered with bead of a structuring material serves as an inlet or outlet channel for forced air circulation. In the area located on the cell container length, the bead path forms an angle of 90° relative to the length of the parallelepiped. This portion 19-1 of the bead forming an angle of 90° constitutes an air inlet duct into channels 17-1, 17-2, ..., 17-n. The portion 19-2 of the bead forming a 90° angle at the opposite end constitutes a duct for outlet of air from the channel.

The invention also provides the following advantages:

Manufacturing time is reduced as compared with the method by resin casting because it is no longer necessary to use resins which take a long time to solidify, as is the case for assembly performed by casting resin for which it is necessary to use resins which take a long time to solidify, for large volumes of resin. According to the invention, a solidification time of less than 5 minutes may be sufficient. Moreover, as polymerization is carried out progressively, layer by layer, this avoids the large increases in temperature that can be observed when casting a large amount of a polymerizable material all at once.

It is easier to remedy material leaks since the latter is deposited in several stages, instead of in a single step using a large amount of material.

It reduces the risk of air bubbles having a large diameter (a few centimeters in diameter) appearing. It is also easier to detect these.

The cost of manufacturing an assembly is reduced in comparison with the assembly technique using mechanical connection means or a foam casting technique.

It is possible to create air flow ducts in the structure which retains the cells, which was impossible with the foam casting technique.

It is possible to assemble large size cells or the latter in large quantities, such as those used for railway or naval applications.

The process can be used to make small and medium series production prototypes.

The method allows creating empty spaces of a defined shape that can be occupied by devices for managing operation of the battery (voltage, temperature sensors, control electronics, wiring harness).

The method of the invention applies to any electrochemical cell technology. Lithium ion cells are nevertheless preferred.

The invention claimed is:

1. A method for assembling a plurality of electrochemical cells comprising the step of depositing layer-by-layer a material which after solidification or cohesion produces a structure which holds the plurality of electrochemical cells together.

2. The method according to claim 1, comprising the steps of:
   a) depositing a first bead of a material,
   b) letting the material of the first bead solidify or achieve cohesion,
   c) depositing a second bead of material on the top of the first bead of material,
   d) letting the material of the second bead solidify or achieve cohesion,
   e) repeating steps c) and d) to produce a structure which holds the plurality of electrochemical cells together.

3. A method of manufacturing an assembly of a plurality of electrochemical cells, the cells each comprising a container having a wall, said method comprising the steps of:
   a) providing a plurality of cells and
   b) assembling the plurality of cells by an additive manufacturing technique comprising the steps of:
      i) depositing a continuous bead Ci of at least one material in contact with at least a portion of a wall of one of the containers;
      ii) complete or partial solidification of the material;
      iii) depositing a bead Ci+1 of a material either on at least a portion of the previously deposited bead Ci or on an electrochemical cell, a material of a bead Ci+1 being able to be the same or different from a material of the bead Ci,
      iv) repeating steps i) to iii) up until overlaying of the beads leads to the formation of partitions ensuring the assembly of the cells, the partition having a series of undulations resulting from the deposition of the successive beads, wherein the beads may have different thicknesses or may be made of dissimilar materials or may have different porosities or different densities.

4. The method according to claim 3, wherein each bead has a thickness, measured in a direction of a longitudinal axis of the container, varying from 0.1 mm to 10 mm.

5. The method according to claim 3, wherein at least two beads have different thicknesses.

6. The method according to claim 3, wherein a pattern of the deposition of bead Ci is obtained:
   a) by moving an apparatus for depositing the bead while keeping the plurality of cells in a fixed position,
   b) by moving the plurality of cells and keeping the device for depositing the bead in a fixed position.

7. The method of claim 6, wherein a path of the deposition of the bead Ci is carried out either in a plane or in the three directions of space and bead Ci is in contact with cells and/or with bead Ci−1.

8. A method of manufacturing an assembly of a plurality of electrochemical cells of prismatic shape or of the pouch type, the cells each comprising a container having a wall, said method employing an additive manufacturing technique for assembling the plurality of cells, said method comprising the steps of:
   a) providing an electrochemical cell Ei;
   b) depositing at least one continuous bead Ci of at least one material in contact with at least a portion of a wall of a container of electrochemical cell Ei;
   c) totally or partially solidifying a material of bead Ci;
   d) overlaying an electrochemical cell Ei+1 on cell Ei;
   e) depositing at least one bead Ci+1 of at least one material in contact with at least a portion of a wall of a container of cell Ei+1, a material of bead Ci+1 being able to be the same or different to that of the material of bead Ci;
   f) total or partial solidification of the material of the bead Ci+1;
   g) repeating steps d) to f), wherein the beads may have different thicknesses or may be made of dissimilar materials or may have different porosities or different densities.

9. The method according to claim 8, wherein each bead has a thickness, measured in a direction of a longitudinal axis of the container, varying from 0.1 mm to 10 mm.

10. The method according to claim 8, wherein at least two beads have different thicknesses.

11. The method according to claim 8, wherein a pattern of the deposition of bead Ci is obtained:
   a) by moving an apparatus for depositing the bead while keeping the plurality of cells in a fixed position,
   b) by moving the plurality of cells and keeping the device for depositing the bead in a fixed position.

12. The method of claim 11, wherein a path of the deposition of the bead Ci is carried out either in a plane or in the three directions of space and bead Ci is in contact with cells and/or with bead Ci−1.

13. An assembly of a plurality of electrochemical cells wherein a cell comprises a container having a wall, said assembly being characterized in that at least a portion of a wall of at least one container is in contact with a partition obtained by an additive manufacturing technique and consists of the overlaying of a plurality of beads of a structuring material, the partition having a series of undulations resulting from the deposition of the successive beads, wherein the beads may have different thicknesses or may be made of dissimilar materials or may have different porosities or different densities.

14. The assembly of claim 13, wherein bead Ci is deposited in a first main direction, bead Ci+1 placed on top of the bead Ci is deposited in a second main direction.

15. The assembly of claim 14, wherein an angular variation of a main direction of depositing two adjacent beads Ci and Ci+1 is predetermined.

16. The assembly according to claim 13, comprising at least two rows of aligned cells and an empty space between two rows, this empty space constituting a channel for natural or forced circulation of a fluid.

17. The assembly of claim 16, comprising at least two channels for natural or forced circulation of a fluid.

18. The assembly of claim 16, comprising at least three rows of cells, and at least one bead defines a non-rectilinear channel extending in two or three dimensions of space, for circulation of fluid.

19. The assembly according to claim 13, wherein a fluid circulation in a space between the beads Ci and Ci+n with n≥1 takes place in counter-flow to a circulation of fluid in a space between the beads Ci and Ci−p, with p≥1.

20. The assembly according to claim 13, further comprising means to improve heat exchange.

21. The assembly according to claim 20, wherein the means to improve heat exchange are molded using a same material as that used to make the bead.

22. The assembly according to claim 20, wherein the means to improve heat exchange are selected from the group consisting of plenums, heat sinks, separator plates, heat exchangers, heat pipes and structural parts.

23. The assembly according to claim 13, wherein at least one space between adjacent cells is completely filled with a single deposit of a structuring material.

24. The assembly according to claim 13, wherein a material in contact with the cells located at the periphery of the assembly has a different density to that of material in contact with cells not located at the periphery of the assembly.

25. The assembly of claim 24, wherein a material in contact with the cells located at the periphery of the assembly has a density greater than that of a material in contact with cells which are not located at the periphery of the assembly.

* * * * *